(12) United States Patent
Allehaux et al.

(10) Patent No.: US 11,148,222 B2
(45) Date of Patent: Oct. 19, 2021

(54) TOOLING FOR HOLDING THIN METAL PARTS MAKING UP A HOLLOW STRUCTURE IN ORDER TO ENABLE THEM TO BE FRICTION-WELDED TOGETHER

(71) Applicant: AIRBUS HELICOPTERS, Marignane (FR)

(72) Inventors: Delphine Allehaux, Velaux (FR);
Jean-Loup Gatti, Marseilles (FR);
Laurent Marchione, Pourrieres (FR);
Philippe Durand, Berre l'Etang (FR)

(73) Assignee: AIRBUS HELICOPTERS, Marignane (FR)

( * ) Notice: Subject to any disclaimer, the term of this patent is extended or adjusted under 35 U.S.C. 154(b) by 153 days.

(21) Appl. No.: 16/505,797

(22) Filed: Jul. 9, 2019

(65) Prior Publication Data

US 2019/0329349 A1      Oct. 31, 2019

Related U.S. Application Data

(62) Division of application No. 14/807,696, filed on Jul. 23, 2015, which is a division of application No. 12/724,455, filed on Mar. 16, 2010, now abandoned.

(30) Foreign Application Priority Data

Apr. 27, 2009    (FR) ...................................... 0902023

(51) Int. Cl.
*B23K 20/12*      (2006.01)
*B23K 37/04*      (2006.01)
(Continued)

(52) U.S. Cl.
CPC .......... *B23K 20/126* (2013.01); *B23K 20/122* (2013.01); *B23K 37/0435* (2013.01);
(Continued)

(58) Field of Classification Search
CPC .............. B23K 20/126; B23K 37/0443; B23K 37/0435; B23K 2101/045;
(Continued)

(56) References Cited

U.S. PATENT DOCUMENTS 3,305,420 A * 2/1967 Brownlee ........... B29C 66/1222
156/217
3,330,550 A * 7/1967 Brownlee ................. B64F 5/10
269/22

(Continued)

FOREIGN PATENT DOCUMENTS

EP    2002919 A2 * 12/2008    ........... B23K 33/004
JP    61146430 A    7/1986
(Continued)

OTHER PUBLICATIONS

Search Report from corresponding French application; FR 0902023; dated Nov. 26, 2009; 6 pages.

*Primary Examiner* — Kiley S Stoner
(74) *Attorney, Agent, or Firm* — Brooks Kushman P.C.

(57) ABSTRACT

The invention relates to tooling for holding parts in position to enable them to be friction welded together in order to construct a hollow structure, the tooling comprises: a framework made up of two frames for receiving the parts for welding together in their positions for forming the hollow structure, said parts comprising preformed parts and an intermediate section; shape-holder members for holding the hollow structure, associating backing thrust members and lateral grip members for gripping the outsides of the preformed parts; anvils suitable for being placed inside the set of preformed parts beside the section; and clamping means operable to take up a clamping position in which they cause opposing thrust to be applied against the anvil and the inside face of a preformed part, its part itself bears against the shape-holder members.

16 Claims, 4 Drawing Sheets

(51) Int. Cl.
*B64F 5/10* (2017.01)
*B23K 101/04* (2006.01)
*B64C 3/26* (2006.01)

(52) U.S. Cl.
CPC ............ *B23K 37/0443* (2013.01); *B64F 5/10* (2017.01); *B23K 2101/045* (2018.08); *B23P 2700/01* (2013.01); *B64C 3/26* (2013.01); *Y10T 29/49998* (2015.01); *Y10T 29/50* (2015.01)

(58) Field of Classification Search
CPC ........... B23K 37/04–0538; B23K 20/12–1295; B64F 5/10; Y10T 29/50; Y10T 29/49998; B23P 2700/01; B64C 3/26
USPC ........... 228/112.1–114.5, 2.1–2.3, 44.3–44.5, 228/212–213
See application file for complete search history.

(56) References Cited

U.S. PATENT DOCUMENTS

| | | | | |
|---|---|---|---|---|
| 3,612,387 | A * | 10/1971 | Rathbun | B23K 1/0014 228/6.1 |
| 3,754,492 | A | 8/1973 | Krauss | |
| 3,893,222 | A | 7/1975 | Ballinger | |
| 3,973,766 | A | 8/1976 | Heath | |
| 4,046,362 | A | 9/1977 | Spillers | |
| 4,080,243 | A | 3/1978 | Pohl | |
| 4,660,815 | A | 4/1987 | Rosser | |
| 4,739,954 | A * | 4/1988 | Hamilton | B64C 3/26 244/123.1 |
| 4,893,398 | A * | 1/1990 | Zimmer | B23K 37/047 219/80 |
| 4,894,903 | A * | 1/1990 | Woods | B25B 11/00 269/131 |
| 4,951,390 | A * | 8/1990 | Fraser | B23K 37/0443 29/402.21 |
| 4,995,146 | A * | 2/1991 | Woods | B25B 5/003 269/45 |
| 5,142,764 | A * | 9/1992 | Whiteside | B21J 15/14 269/32 |
| 5,199,147 | A * | 4/1993 | Whiteside | B21J 15/14 269/32 |
| 5,216,799 | A * | 6/1993 | Charnock | B64C 3/18 244/133 |
| 5,492,581 | A * | 2/1996 | Searle | B23K 20/1205 156/73.5 |
| 6,003,756 | A * | 12/1999 | Rhodes | B22C 7/00 228/160 |
| 7,325,307 | B2 * | 2/2008 | Franchet | B23P 15/04 228/118 |
| 8,661,684 | B1 * | 3/2014 | Boyd | B64F 5/10 29/897.2 |
| 2003/0192415 | A1 | 10/2003 | Hilliard et al. | |
| 2004/0050907 | A1 | 3/2004 | Dracup et al. | |
| 2004/0055349 | A1 * | 3/2004 | El-Soudani | B64C 3/24 72/56 |
| 2004/0060964 | A1 * | 4/2004 | Kottilingam | F01D 5/187 228/112.1 |
| 2005/0045693 | A1 | 3/2005 | Buchheit et al. | |
| 2006/0062964 | A1 * | 3/2006 | Ikuyama | B64C 3/26 428/137 |
| 2008/0084012 | A1 * | 4/2008 | Matlack | B23Q 3/069 269/20 |
| 2008/0155807 | A1 * | 7/2008 | Toh | B21J 15/14 29/525.01 |
| 2009/0282668 | A1 * | 11/2009 | Sanchez-Brunete Alvarez | B23P 19/10 29/428 |
| 2009/0283509 | A1 * | 11/2009 | Frauen | B23K 26/242 219/121.85 |
| 2010/0006700 | A1 * | 1/2010 | Stuhr | B64C 3/26 244/123.1 |
| 2010/0247949 | A1 * | 9/2010 | VanDyke | B32B 15/01 428/615 |
| 2011/0210112 | A1 * | 9/2011 | Boatner, Jr. | B23K 9/0354 219/158 |
| 2012/0224972 | A1 * | 9/2012 | Stiehler | B23K 13/00 416/223 A |
| 2012/0280021 | A1 * | 11/2012 | Stiehler | B23K 20/129 228/114.5 |
| 2015/0004347 | A1 * | 1/2015 | Kline | B29C 65/26 428/58 |
| 2015/0259079 | A1 * | 9/2015 | Kirkwood | B64C 3/185 228/44.3 |

FOREIGN PATENT DOCUMENTS

| | | |
|---|---|---|
| JP | 10230375 A | 9/1998 |
| JP | 11058038 A | 3/1999 |

* cited by examiner

Fig.4

TOOLING FOR HOLDING THIN METAL PARTS MAKING UP A HOLLOW STRUCTURE IN ORDER TO ENABLE THEM TO BE FRICTION-WELDED TOGETHER

CROSS-REFERENCE TO RELATED APPLICATIONS

This application is a division of U.S. application Ser. No. 14/807,696 filed Jul. 23, 2015, now issued as U.S. Pat. No. 10,384,303 on Aug. 20, 2019, which is a division of U.S. application Ser. No. 12/724,455 filed Mar. 16, 2010, now abandoned, which, in turn, claims priority of French Application Serial No. FR 0902023 filed Apr. 27, 2009, the disclosures of which are hereby incorporated in their entirety by reference herein.

TECHNICAL FIELD

The invention lies in the technical field of using friction-welding to weld together various thin metal parts for assembly. The invention provides holder tooling for holding said parts to enable them to be friction-welded together, so as to obtain a hollow structure such as an airfoil, a tail fin, or an analogous hollow structure.

BACKGROUND

Welding techniques include those performed by friction, such as so-called "friction stir welding" (FSW). Such a technique is advantageous for assembling together metal parts that are thin, e.g. presenting thickness of less than about 1.5 millimeters (mm). By way of example, such parts are constituted by plates, sheets, or other analogous parts that are thin and of large dimensions in the general plane in which they extend. The parts may be plane parts or they may be shaped, and their edges that are used for welding them together are considered as being generally plane in the welding zone. In general terms, the friction-welding technique consists in holding together the parts that are to be assembled by means of specific tooling. More particularly, the parts are held adjacent one another and pressing one against the other, e.g. in abutment so as to put their corresponding edge faces into contact one against the other, or with one of the edges of a first part overlapping the edge of a second part. The first part is thicker than the second part and it includes a rabbet or analogous feature for receiving the corresponding edge of the second part.

With the parts held in position for welding by the tooling, a chuck carrying a welding pin is used to cause the adjacent edges of the part to be heated. The welding pin is provided with roughness in relief formed at its free end remote from its end that is engaged in the chuck. By way of example, this roughness in relief is a thread or is the result of the free end of the welding pin being given a section of polygonal shape. Putting the welding pin into contact with the adjacent edges of the parts and then moving it relative thereto serves to cause a bead of welding to be formed, thereby assembling the parts together. The bead of welding is obtained in the welding zone as a result of the parts heating under the effect of the friction applied locally thereto by the welding pin. This heating causes the materials constituting the parts to take on a pasty state, which materials then mix together by spreading. The parts are subsequently joined together by continuous dynamic recrystallization of the material in the welding zone.

In a first technique for holding the parts, their edges are held pressed adjacently against an anvil by clamping or by some other analogous technique. Clamping members press at least one of the parts against opposing thrust received by one and/or the other of the parts against an anvil. The term "anvil" is used to designate any member suitable for forming a bearing surface or analogous bearing member against which the parts are pressed by clamping, whether directly or indirectly.

In a second technique for holding the parts, the edges of the parts are held in their relative position by means of a pair of spools bearing respectively against one and the other of the opposite faces of the parts to be assembled together. More particularly, a bottom spool is fitted with the welding pin arranged as a threaded rod that is secured to a top spool. Clamping the edges of the parts between the spools enables them to be docked and held together in localized manner in the welding zone.

Furthermore, in the field of aviation, it is desirable to be able to make a hollow structure that is made up of a plurality of parts that are assembled together one after another. Such a hollow structure constitutes in particular an airfoil, a tail unit, or some other analogous hollow structure. For example, two component parts of the hollow structure may be preformed by being folded in half so as to enable them to be shaped, and they are abutted via a third part that is arranged as a transversal section for transversally stiffening the hollow structure. Each preformed part presents a generally plane profile of the hollow structure, one of the parts constituting a leading profile and the other a trailing profile. The section has an I-shaped section or the like with end flanges depending on the profile of the section. The section is interposed between the facing edges of the leading profile and of the trailing profile, said section being oriented orthogonally relative to the general plane in which the preformed parts extend. The flanges of the section include rabbets for receiving respective corresponding edges of the parts, so as to make it easier to position them relative to one another.

Traditionally, a riveting technique is used for assembling the preformed parts with the section.

Nevertheless, it is desirable for the rivets to be flush with the outside face of the hollow structure, and this is difficult to achieve when the desired preformed parts are of small thickness, e.g. of thickness less than about 1.5 mm. Although the friction welding assembly technique is advantageous for use in assembling preformed parts with the section, it is difficult to implement in this context. Applying the welding pin against the edges of the preformed parts gives rise to large tensions and vertical forces in the general plane in which the parts extend. The quality and the reliability of the resulting assembly are uncertain, and holding the preformed parts in shape during the welding operation is difficult to achieve, particularly since the hollow structure is made up of preformed parts that are thin and that present a cross section of height that is small relative to length in the general plane in which they extend.

The first above-mentioned holding technique is more particularly suitable for use in assembling plane or curved parts having adjacent edges that are held in abutment via their corresponding edge faces, or else in overlap. The parts are held firmly and effectively over their entire length throughout the complete welding operation serving to form the bead of welding. However, at present, that holder tooling is massive and although it is effective for parts that are plane or curved, it is not suitable in its current state for assembling together parts that enable a hollow structure of the above-mentioned kind to be made.

The second above-mentioned technique for holding the parts runs the risk of the parts overheating because they are engaged between the spools and because of the resulting friction. When assembling together parts of small thickness, thickness of the order of less than 1.5 mm, such heating tends to give rise to local spoiling of the properties of the material constituting the parts, and can even make it impossible to obtain continuous dynamic recrystallization of the resulting bead of welding. In addition, localized holding of the preformed parts at their corresponding edges does not guarantee that they are kept in shape, and therefore does not guarantee that a hollow structure will be obtained that is made up of the desired profiles.

Furthermore, document US 2004/050907 describes using a plurality of anvils and pressure backing-tools in order to hold the parts for assembly in position in the vicinity of the connection that is to be made.

Document JP 10230375 describes using anvil systems so as to avoid the parts moving apart during friction welding.

Document JP 11058038 describes a device that provides more thorough holding of the structure. In contrast, document US 2005/045693 provides for localized holding of the parts.

Finally, document JP 61146430 provides for the use of two frames.

SUMMARY

The object of the present invention is to propose tooling for holding thin metal parts together to enable them to be friction-welded to each other in order to construct a hollow structure that constitutes in particular an airfoil, a tail unit, or some other analogous hollow structure. The hollow structure is made up in particular of preformed parts forming at least a leading profile and a trailing profile, and it houses at least one section providing transverse stiffening and an intermediate junction between the preformed parts. More specifically, the proposed tooling is of the kind making use of at least one anvil and of shape-holder members for holding the parts against the anvil.

The present invention seeks more particularly to provide such tooling that enables the axial forces to be taken up that result from pressing the welding pin against the edges of the parts, and that also serves to take up the lateral forces that result from tensions induced in the parts during the welding operation so as to avoid deforming the profiles of the resulting hollow structure.

The present invention also seeks more particularly to provide such tooling that is suitable for use in making a hollow structure with a wall that is of small thickness, of the order of less than 1.5 mm, and of an inside volume that is relatively small. Such an inside volume corresponds to a hollow structure having overall height of an order lying in the range 50 mm to 100 mm for a width of an order lying in the range 300 mm to 600 mm and for a length of an order lying in the range 2000 mm to 4000 mm. These numbers are given by way of indication and they do not restrict the scope of the present invention, but rather they illustrate the difficulties that need to be overcome in applying the present invention to holding parts in order to obtain a hollow structure using a friction-welding technique between the parts. These difficulties lie in particular in providing tooling that is as compact as possible and that is suitable for use in forming such hollow structures.

The present invention also seeks more particularly to provide such tooling that is suitable for holding in shape preformed parts while the welding operation is being performed in order to guarantee that the hollow structure that is obtained has the desired shape. The tooling must also make it possible to accommodate the docking and thickness tolerances of the parts over their entire length, without that affecting the quality of the resulting bead of welding.

The present invention also seeks more particularly to provide such tooling in which the operations needed to implement it during the various successive steps of welding the parts together are few in number and easy and quick to perform.

Broadly, the present invention consists in deciding to use the technique of holding parts for a friction welding operation that consists in clamping the parts for welding together between shape-holder members and at least one anvil. The choice of this holding technique seeks to assemble the parts together in a manner that is robust and reliable in spite of their small thickness, of the order of less than 1.5 mm, via a welded joint that is of constant quality along the welded-together parts because of the reliable control achieved over the heat generated and because continuous and stable dynamic recrystallization is obtained of the bead of welding that is being made.

It is recalled that the parts for welding together are parts that are arranged relative to one another so as to make up a hollow structure after they have been welded in succession one to another. These parts for welding are made up in particular of preformed parts that provide the profile of the hollow structure that is to be obtained and of at least one internal stiffening and junction section intermediate between the preformed parts. In particular, at the ends of its section, such a section includes flanges that are suitable for receiving in overlap the corresponding edges of the preformed parts so that they can be welded together. The section preferably has an I-shaped cross section, or any other analogous section that provides at least one middle web having said flanges at its ends. Preferably, the flanges are of a thickness that is greater than the thickness of the edges of the parts for welding together, and they include rabbets receiving said edges so as to enable them to be lap welded, using the "self-holding joint" technique.

The empty inside of the hollow structure is used to receive the anvil and clamping means that serve to press together the edges of the parts for welding in a direction that corresponds to the direction in which the welding pin applies pressure against the parts during the friction-welding operation. The edges for welding together are clamped between the anvil located inside the hollow structure and the shape-holder members that are placed outside the hollow structure, bearing against the outside face of the preformed parts. This clamping is achieved by operating the clamping means that are placed inside the hollow structure and that exert lateral thrust against the anvil. The anvil is placed beside the section and is held by lateral clamping between the section and the clamping means that bear against the inside faces of the preformed parts installed inside the framework. The clamping means make use in particular of deformable means, such as inflatable bladders or the like in order to make them easier to operate and also to make it easier to assemble and disassemble the tooling. The shape-holder members are carried by frames that are placed on either side of the hollow structure that is to be obtained, on either side of the general plane in which it extends. These frames include junction means for joining them together, e.g. making use of co-operating fastener members, so that together they constitute a framework that houses in position all of the parts for welding together, holding them by means of the shapeholder members. The shape-holder members are preferably mounted to move on the framework so as to enable their positions to be adjusted relative to the shape of the hollow structure to be obtained. The section is installed on the frames by means of the flanges with which it is provided. Each frame has a pair of middle length-members that extend in the general direction in which the hollow structure that is to be obtained extends, and that leave between them a path for passing the welding pin.

Lateral grip members for gripping the preformed parts are carried by the framework to hold the profile of the hollow structure that is to be obtained in shape, while avoiding any deformation of the preformed parts during the welding operation. Such a grip member individually comprises a jaw of profile that is complementary in shape to the profile of the outside portion of the preformed part with which it is associated. The lateral grip members are distributed along the framework in the general direction in which the hollow structure that is to be obtained extends.

The framework is suitable for being turned over so that the welding operations can be performed firstly on one large face of the hollow structure that is to be obtained and then on the other large face, without any need to disassemble the part-holder tooling.

According to a general definition of the present invention, the proposed tooling is tooling for holding parts in order to enable them to be friction-welded together in order to construct a generally plane hollow structure. The hollow structure is more particularly made up of a set of preformed parts that are successively abutted via at least one internal stiffening section of the hollow structure that is to be obtained. Such a hollow structure is constituted in particular by an airfoil, a tail unit, or some other analogous hollow structure. The section is advantageously used as an intermediate junction part for joining together the preformed parts, and it is provided at the ends of the section with flanges for receiving the edges of the preformed parts in overlap. The tooling includes at least one anvil suitable for receiving the adjacent edges of the parts for welding together pressed thereagainst, and reversible clamping means suitable for subjecting said edges to opposing thrust between the anvil and shape-holder members for the hollow structure, and more particularly preformed parts installed inside the framework.

According to the present invention, such tooling is mainly recognizable in that it comprises: a framework for receiving the parts for welding together in their positions for forming the hollow structure, the framework being subdivided into two frames provided with reversible junction means for joining them together in an assembled position on either side of the hollow structure that is to be obtained, on either side of the general plane in which it extends; said shape-holder members for holding the preformed parts installed inside the framework, which members are carried by the framework; at least one anvil suitable for being placed inside the set of preformed parts installed inside the framework, being placed laterally relative to the section, between its flanges; and said clamping means suitable for being placed inside the set of preformed parts installed inside the framework, which clamping means are movable into a clamping position in which they cause opposing thrust to be applied between the anvil and the inside face of at least one preformed part associated with the clamping means.

Preferably, the shape-holder members comprise at least one lateral grip member for gripping an outer preformed part of the hollow structure with which it is associated.

In particular, the lateral grip member is mounted on the framework via movement means enabling it to move between a disengaged position in which its grip on the preformed parts associated therewith is capable of being interrupted, and a clamping position in which it is suitable for exerting grip on the outer side of said preformed part.

Preferably, the lateral grip member includes a jaw of shape that is complementary to the portion of the preformed part with which it is associated and against which it is suitable for coming into engagement.

In a preferred embodiment, the lateral grip member is subdivided into a plurality of individual lateral grip members that are distributed along the framework along its side extending in the extension direction of the hollow structure that is to be obtained.

Preferably, the individual lateral grip members are individually mounted to move on the framework. This subdivision of the lateral grip member enables the clamping positions of individual lateral grip members to be adjusted individually, with the advantage of being able to accommodate tolerances in the straightness of the edges of the preformed parts, and possibly also variations in the thrust they receive in overlap against the section.

Preferably, the shape-holder members comprise backing thrust members that are individually mounted on one and/or the other of the frames via position adjustment means.

Advantageously, the backing thrust members are distributed at least along a pair of length members forming part of each of the frames, the length members of the pair leaving between them a path for passing a welding tool towards the preformed parts placed in overlap on the flanges of the section.

In an advantageous embodiment, the clamping means are arranged as deformable members that are movable between said clamping position and an assembly position in which they are suitable for being inserted in floating manner inside the set of preformed parts installed inside the framework. Such deformable clamping means are constituted, for example, as at least one inflatable bladder or analogous deformable member.

In a preferred embodiment of the clamping means, the clamping means comprise a body that is suitable for bearing against said inside face of the preformed part and that houses the bladder suitable for bearing against said anvil.

Preferably, the framework includes handle members suitable for engaging overturning means forming parts of a stand of a friction-welding machine.

In particular, the anvils are at least two in number, being associated with a single section and being suitable for being placed laterally on either side thereof.

The present invention also provides a method of implementing part-holder tooling as described above, the method being suitable for allowing said parts to be friction-welded together in order to obtain a hollow structure made up of said parts.

In general terms, the method consists in performing the following operations:

Placing the section in position on one of the frames. This operation consists more particularly in placing the section on one of the frames, in causing the corresponding flange of the section to be carried between the length members that are incorporated in said frame and that leave between them the path for passing the welding pin. Placing the anvil in position on said frame beside the section on the side allocated thereto. Preferably, a pair of anvils is placed on the frame, these anvils being disposed laterally on either side of the section, and more particularly on either side of the web or the like that it includes. Placing the clamping means associated with said frame on its corresponding lateral side. Preferably, a pair of clamping means is placed on the frame, the clamping means being disposed laterally relative to one of the anvils with which they are associated. Docking the parts for welding in succession against the section by sliding their corresponding walls at least under the anvil and possibly also under the clamping means and over at least one of the shape-holder members. This docking corresponds in particular to causing the flanges of the section to be overlapped by corresponding edges of a preformed part. Each flange of the section includes an outer rabbet for receiving the corresponding edge of a preformed part. Putting the preformed part into place causes their corresponding outer faces to come into contact with the corresponding backing thrust members with which the frame is provided. Putting the other frame in place and joining the frame together, in particular to form the framework. The preformed parts are thus placed in position on one of the frames, with the installation of the other frame enabling the shape-holder members with which it is equipped, and more particularly the backing thrust members, to be put into contact with the corresponding outside faces of the preformed parts. Operating the clamping means. This operation consists more particularly in inflating the bladders so as to press the anvils laterally against the section, causing bodies housing the bladders to apply opposite thrust against the corresponding inside faces of the preformed parts.

Preferably, the proposed method further includes the operation consisting in operating said lateral grip means prior to operating the clamping means.

Advantageously, the proposed method includes the additional steps consisting, after the parts have been welded together in one of the large faces of the hollow structure that is to be obtained, in turning the framework over in order to weld the parts together in the other large face of the hollow structure that is to be obtained.

Preferably, implementing the clamping means consists in applying lateral thrust against the anvil so as to cause the flanges of the section to bear against the corresponding edges of the preformed parts. In such a method, the shape-holder members constitute backing thrust members against which said preformed parts are respectively pressed under the effects of the section being held in position and of the backing thrust being pressed laterally by the clamping means respectively against the section and against the inside faces of the preformed parts in the general direction in which they extend.

BRIEF DESCRIPTION OF THE DRAWINGS

A preferred embodiment of the present invention is described below with reference to the figures of the accompanying sheets, in which.

DETAILED DESCRIPTION

Figure 1:
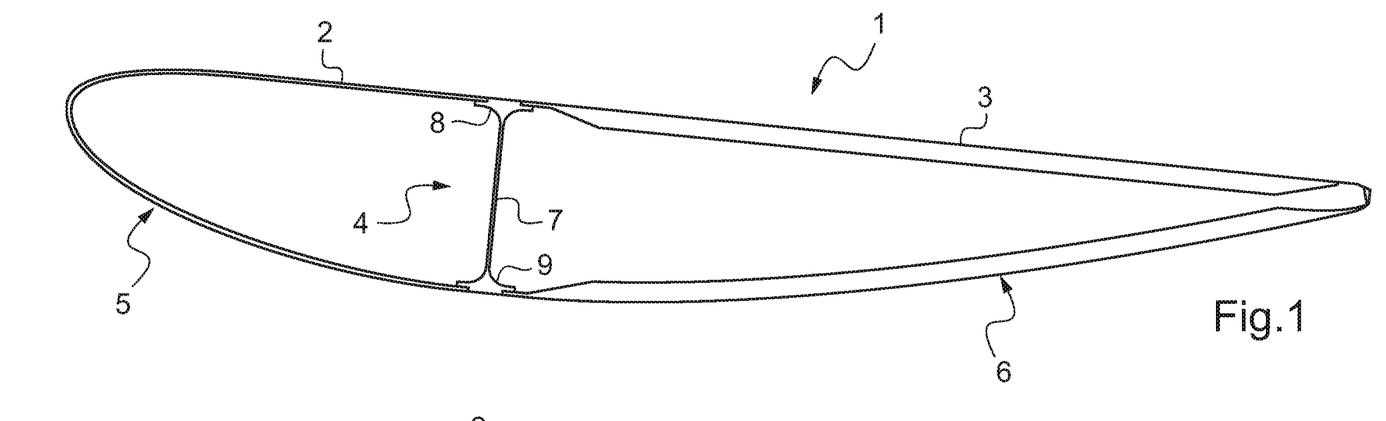
FIG. 1 is an example of a hollow structure that is to be obtained by joining together the various parts making it up by friction-welding.
Figure 2:
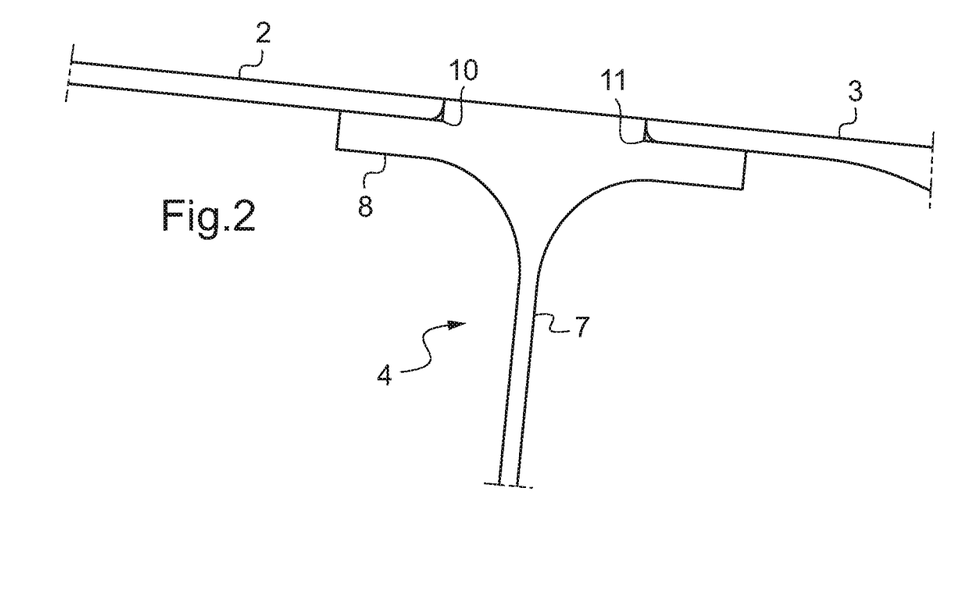
FIG. 2 is a detail of FIG. 1, showing the particular ways in which an edge of one part for welding is arranged to overlap an edge of another part.

In FIG. 1, a hollow structure 1 is obtained from a plurality of parts 2, 3, 4 that are welded to one another by friction. In the embodiment shown, the hollow structure 1 is an airfoil that presents a leading profile and a trailing profile 6, and that includes an internal stiffening section 4. This hollow structure 1 has an overall height of about 70 mm for a width of about 500 mm and a length in its general extension plane of about 3000 mm. Two parts 2 and 3 are preshaped respectively to form the leading profile 5 and the trailing profile 6, and they are assembled together via the section 4. With reference also to FIG. 2, the section 4 is an I-shaped member made up of a web 7 provided at each of its ends with a flange 8, 9 that is used for welding the section 4 to the corresponding edges of the preformed parts 2, 3. Each of the flanges 8, 9 of the section 4 has rabbets i0, ii for receiving in overlap the corresponding edges of the preformed parts 2, 3 using the "self-holding joint" assembly technique. The preformed parts 2, 3 and the section 4 are assembled together by a weld bead using the friction-welding technique whereby a welding pin heats the parts 2 and 4 and then the parts 3 and 4 for assembling together in succession so as to cause material forming the weld bead to spread and mix.

Figure 3:
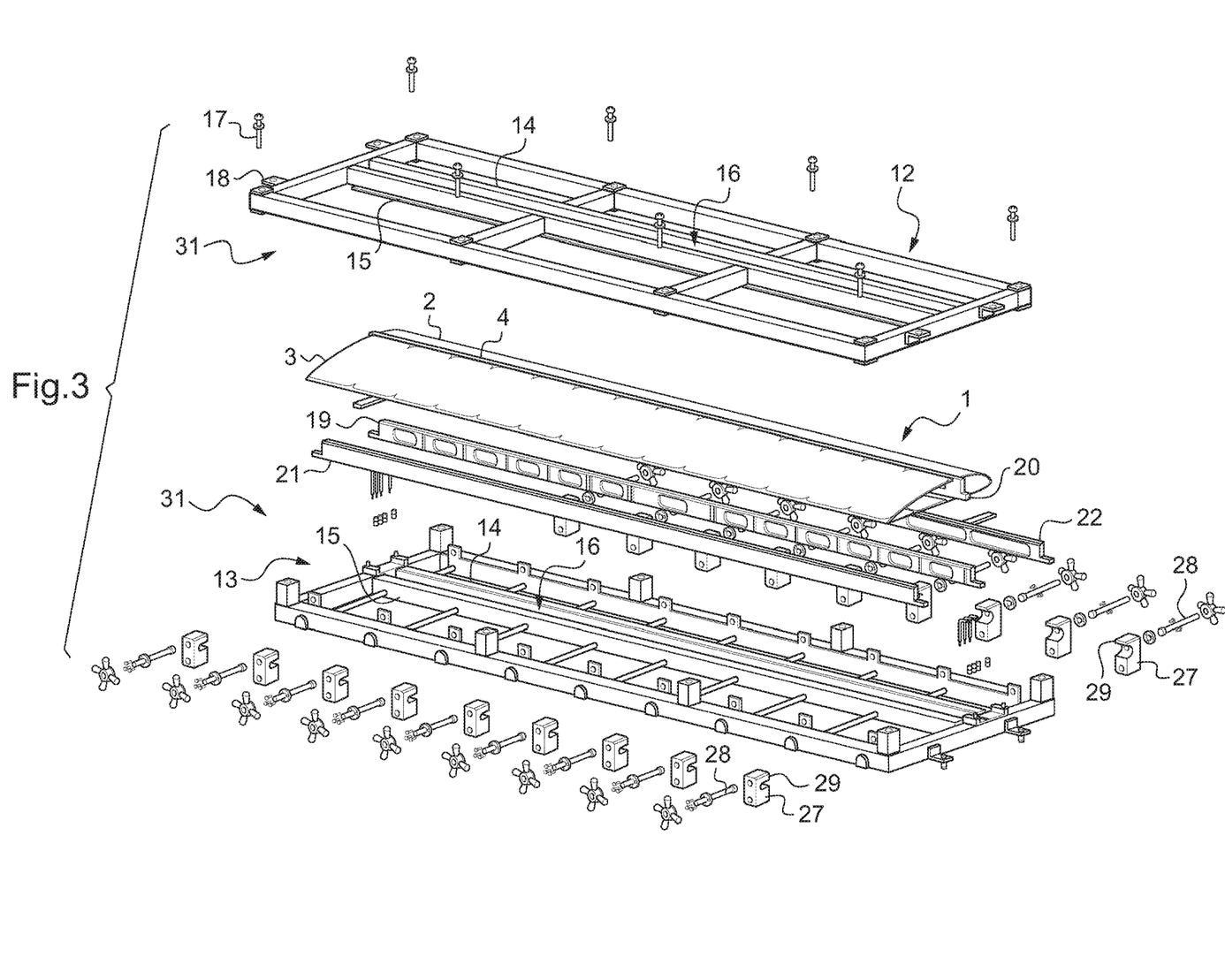
FIGS. 3 and 4 are respectively exploded and assembled perspective views of tooling for holding parts for welding together in order to obtain a hollow structure as shown in FIG. 1.
Figure 4:
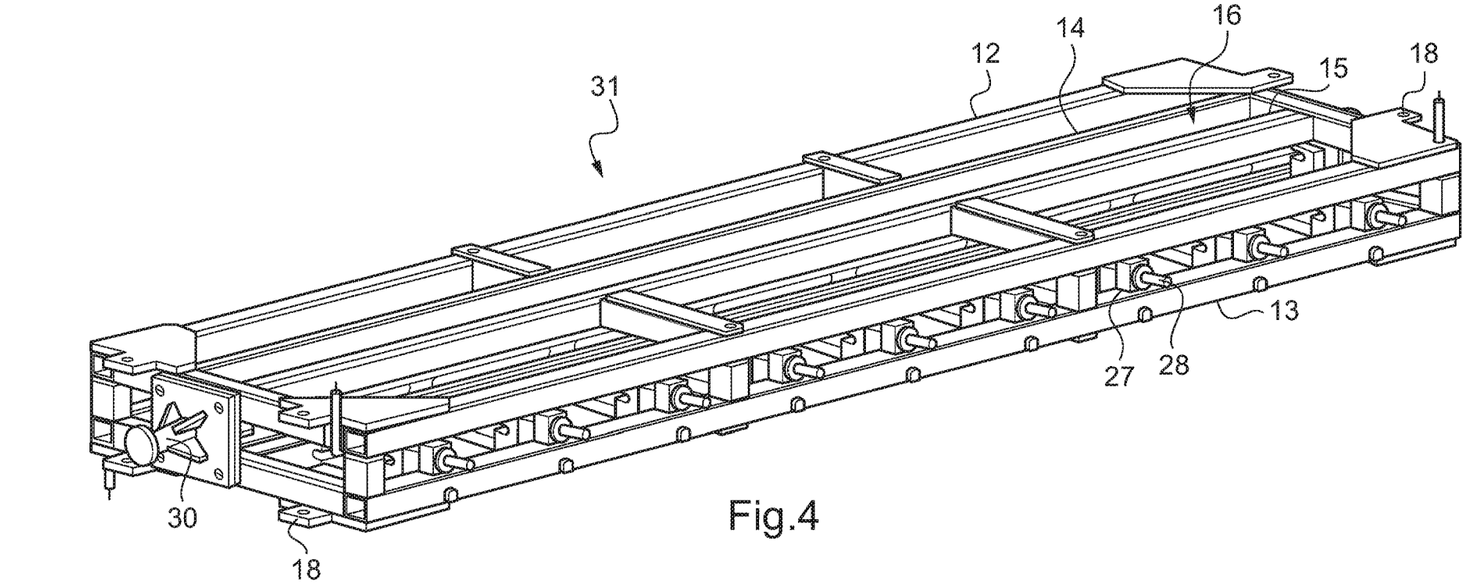
Figure 5:
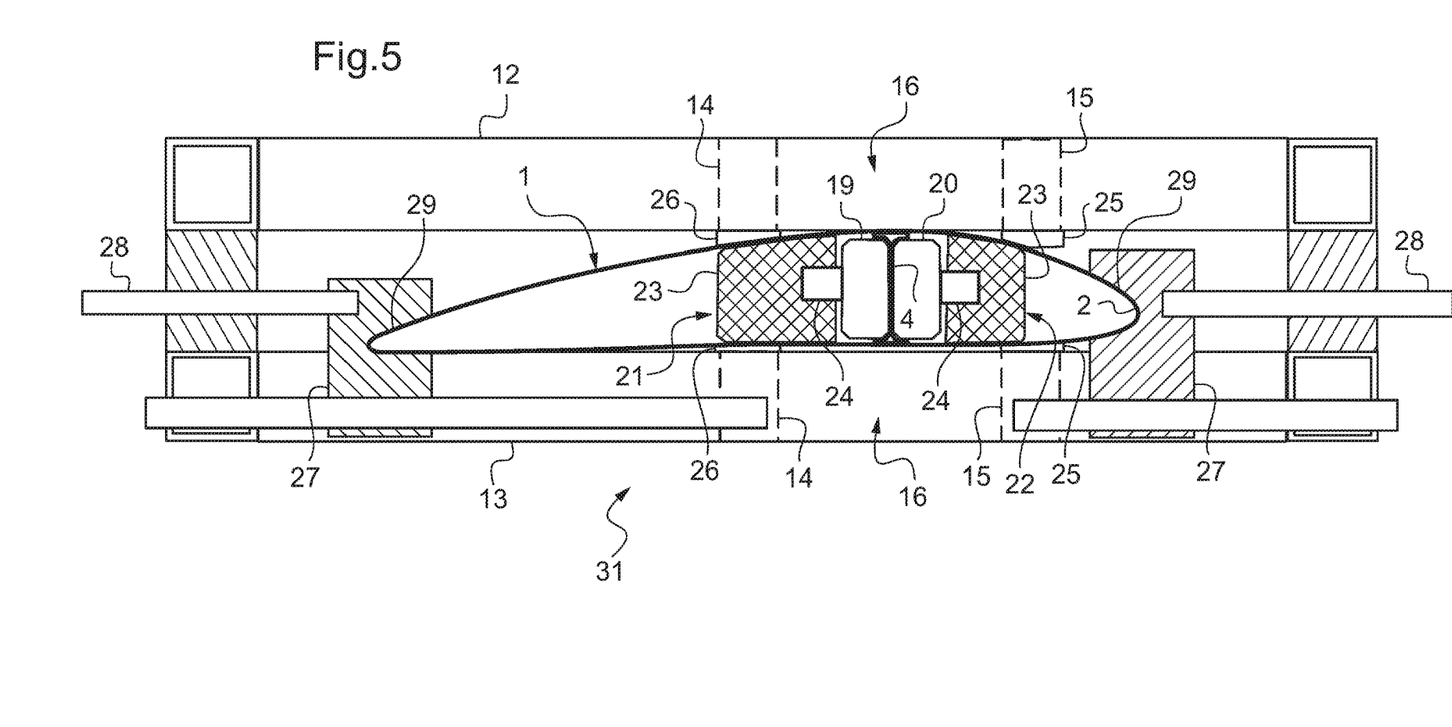
FIG. 5 is a section view of the holding tooling of FIGS. 3 and 4 having installed therein the various parts for welding together.

In FIGS. 3 to 5, tooling is organized for holding the parts 2, 3, 4 making up the hollow structure 1 shown in FIG. 1 for the purpose of performing all of the welding operations needed to obtain said hollow structure 1. The tooling is arranged to enable all of these welding operations to be performed starting from a single installation of the parts 2, 3, 4 making up the hollow structure 1 on said tooling. This installation can be performed quickly and easily, with the parts 2, 3, 4 being accurately positioned relative to one another, while nevertheless taking account of docking tolerances between the parts 2, 3, 4 and any possible variations in their thicknesses. In addition, the tooling serves to hold the hollow structure 1 in shape in spite of the forces and tensions to which it is subjected during the various welding operations, as results in particular from pressing the welding pin against the parts 2, 3, 4 and from the heat given off by forming the weld beads.

The tooling comprises two frames 12, 13 that make up a framework 31 for receiving the parts 2, 3, 4 for welding together in their positions for forming the hollow structure 1. These frames 12, 13 are generally rectangular, each having middle length-members 14, 15 extending in the general extension direction of the hollow structure 1 to be obtained. For each of the pairs of length members 14, 15, a path 16 is provided for passing the welding pin between the length members 14, 15 so as to enable the pin to be pressed against the edges of the parts 2, 3, 4 for welding together. The frames 12, 13 are suitable for being placed on either side of the hollow structure 1 that is to be obtained, on either side of its general extension plane, and they are provided with junction means 17, 18 for joining them together, which means are constituted by co-operating fastener members, for example.

A pair of anvils 19, 20 is fitted inside the preformed parts 2, 3 placed in their welding positions on the framework 31. This pair of anvils 19, 20 may be constituted by anvils that are structurally distinct or by a one-piece unit, in which case the anvils 19, 20 are connected together at their ends in a zone lying outside the zone in which the weld beads are formed. More particularly in FIG. 5, the anvils 19, 20 are placed on either side of the web 7 of the section 4 in order to exert lateral thrust thereagainst so as to hold it in position. This lateral thrust is applied by using clamping means 21, 22 located respectively on opposite sides of the anvils 19, 20 on their sides remote from the sides that thrust against the web 7 of the section 4. These clamping means 21, 22 comprise a body 23 that houses an inflatable bladder 24. Each frame 12, 13 carries backing thrust members 25, 26 against which the preformed parts 2, 3 press when the clamping means 21, 22 are put into operation. These backing thrust members 25, 26 are members that comprise a set of members for holding the hollow structure that is to be obtained in shape. Inflating the bladders 24 causes them to be pressed against the corresponding anvils 19, 20 and causes an opposing thrust to be applied by the bodies 23 against the inside faces of the preformed parts 2, 3 with which they are associated. The preformed parts 2, 3 are clamped between the clamping means 21, 22 and more particularly between the body 23 and the backing thrust members 25, 26 that are carried by the frames 12, 13. The backing thrust members 25, 26 are carried in particular by the middle length members 14, 15 forming parts of the frames 12, 13, being positioned to correspond with the bearing zones occupied by the body 23 of each of the clamping means 21, 22 against the inside faces of the corresponding preformed parts 2, 3.

The framework 31 is provided with lateral grip members 27 for gripping the preformed parts 2, 3, which members are disposed along the framework 31 along its side corresponding to the general extension of the hollow structure 1 that is to be obtained. These lateral grip members 27 are members forming part of the set of members for holding the hollow structure i that is to be obtained in shape. These lateral grip members 27 are constituted by a plurality of individual lateral grip members that are mounted on the framework 31 via individual movement means 28. The lateral grip members 27 are movable between a disengaged position enabling the preformed parts 2, 3 to be installed on the framework 31, and a clamping position in which the lateral grip members 27 engage the ends of the preformed parts 2, 3. Each lateral grip member 27 has a jaw 29 of shape that is complementary to the portion of the preformed parts 2, 3 with which it comes into engagement. While the welding operations are being performed, the preformed parts 2, 3 are held in shape on the framework 31 by the combination of thrust exerted against them by the shape-holder members, comprising the backing thrust members 25, 26 and the lateral grip members 27.

In FIG. 4, the framework 31 is fitted with handle members 30 enabling it to be turned over. These handle members 30 serve, after welding operations have been preformed on one of the faces of the hollow structure 1 that is to be obtained, to turn the framework 31 over and allow welding operations to be performed on the other face of the hollow structure 1. Turning the structure over in this way serves more particularly to enable all of the operations of welding the parts 2, 3, 4 together to be preformed so as to obtain the hollow structure 1 without it being necessary to remove the parts 2, 3, 4 from the holder tooling.

What is claimed is:

1. A friction-welding machine for friction-welding a generally hollow structure having a pair of preformed parts and at least one internal stiffener section, the friction-welding machine including a tooling for holding the pair of preformed parts to be friction-welded together to form the generally hollow structure with the at least one internal stiffener section, the friction-welding machine comprising:

a framework positioned along outer surfaces of the preformed parts and holding the pair of preformed parts inside the framework against the internal stiffener section to form the hollow structure, the framework having two generally rectangular frames formed of a pair of length members extending in an extension direction, the two frames movable with respect to each other to be joined together in an assembled position on both outer surfaces of the preformed parts and extending in the general plane in which the hollow structure extends the framework including shape-holder members which are shaped to correspond and contact an outer surface of the preformed parts;

a friction-welding path defined between the length members of the framework, wherein a friction-welding pin is adapted to be passed through the friction-welding path to friction-weld the preformed parts together, at least one anvil installed inside the framework and extending in the extension direction, the anvil adapted for being inserted inside the pair of preformed parts laterally adjacent the internal stiffener section; and a reversible clamp installed inside the framework and extending in the extension direction adapted for being inserted inside the pair of preformed parts laterally adjacent the anvil, wherein the clamp applies a clamping thrust in at least two directions such that thrust is applied in a lateral direction to the anvil and the clamp applies thrust in a second direction along an inside surface of each of the pair of preformed parts to oppose force applied to the outer surface of the pair of preformed parts by the shape-holder members of the framework, wherein the pair of preformed parts is held with the clamp and framework in a friction-welding position so abutting edges of the pair of preformed parts are friction-welded together adjacent the internal stiffener section along the extension direction of the hollow structure.

2. The friction-welding machine according to claim 1, wherein the reversible clamp inflates to apply the clamping force.

3. The friction-welding machine according to claim 2, wherein the reversible clamp is deflated while installed in the framework inside the hollow structure, and the reversible clamp inflates to apply the clamping force.

4. The friction-welding machine according to claim 2, wherein the reversible clamp includes at least one inflatable bladder.

5. The friction-welding machine according to claim 4, wherein the reversible clamp includes a body that provides for bearing against the inside face of the preformed part and for bearing against the anvil, wherein the body houses the inflatable bladder.

6. The friction-welding machine according to claim 2, wherein the reversible clamp includes two inflatable bladders for being placed laterally on either side of the internal stiffener section.

7. The friction-welding machine according to claim 6, wherein the at least one anvil includes two anvils for being placed laterally on either side of the internal stiffener section and each anvil opposing the clamping force of one of the two inflatable bladders.

8. The friction-welding machine according to claim 1, the at least one anvil and the reversible clamp are adapted to be positioned adjacent an inside surface of the preformed parts opposite the outer surfaces.

9. The friction-welding machine according to claim 1, wherein the friction-welding path extends in the extension direction.

10. The friction-welding machine according to claim 1, wherein the shape-holder members include backing thrust members that are individually mounted on the framework with position-adjustment means to oppose thrust applied by the reversible clamp.

11. The friction-welding machine according to claim 10, wherein the backing thrust members are distributed mounted on length members extending in an extension direction of the framework.

12. A friction-welding tooling for holding on a friction-welding machine a pair of preformed parts to be friction-welded together to form a generally hollow structure having at least one internal stiffener section, the friction-welding tooling comprising:
   a framework positioned along outer surfaces of the preformed parts and holding the pair of preformed parts inside the framework against the internal stiffener section to form the hollow structure, the framework having two generally rectangular frames formed of a pair of length members extending in an extension direction, the two frames movable with respect to each other to be joined together in an assembled position on both outer surfaces of the preformed parts and extending in the general plane in which the hollow structure extends the framework including shape-holder members which are shaped to correspond and contact an outer surface of the preformed parts;
   a friction-welding path defined between the length members of the framework, wherein a welding pin is adapted to be passed through the welding path to weld the preformed parts together,
   two anvils installed inside the framework and extending in the extension direction and installed laterally on either side of the internal stiffener section; and
   two reversible clamps installed inside the framework and extending in the extension direction for being inserted inside the pair of preformed parts, wherein each clamp applies a clamping thrust in at least two directions such that thrust is applied in a lateral direction to one of the anvils and each clamp applies thrust in a second direction along an inside surface of each of the pair of preformed parts to oppose force applied to the outer surface of the pair of preformed parts by the shape-holder members,
   wherein the pair of preformed parts is held with the clamps and framework in a welding position so that abutting edges of the pair of preformed parts is friction-welded together adjacent the internal stiffener section along the extension direction of the hollow structure.

13. The tooling according to claim 12, wherein the reversible clamps inflate to apply the clamping forces.

14. The tooling according to claim 13, wherein the reversible clamps are deflated while installed in the framework inside the hollow structure, and the reversible clamps inflate to apply the clamping forces.

15. The tooling according to claim 13, wherein each reversible clamp includes an inflatable bladder for being placed laterally on either side of the internal stiffener section.

16. The tooling according to claim 12, wherein each reversible clamp applies a clamping thrust in at least two directions such that thrust is applied in a lateral direction and each reversible clamp applies thrust in a second direction along an inside surface of each of the pair of preformed parts to oppose force applied to the outer surface of the set of preformed parts by the shape-holder members.

* * * * *